United States Patent [19]

Wilson et al.

[11] Patent Number: 5,605,634

[45] Date of Patent: Feb. 25, 1997

[54] TREATMENT OF CONTAMINATED GROUNDWATER

[75] Inventors: Ryan D. Wilson, Kitchener, Canada; Douglas M. Mackay, Stanford, Calif.

[73] Assignee: University of Waterloo, Canada

[21] Appl. No.: 426,966

[22] Filed: Apr. 24, 1995

[30] Foreign Application Priority Data

Apr. 23, 1994 [GB] United Kingdom .................. 9408125

[51] Int. Cl.⁶ .................................................. C02F 1/00
[52] U.S. Cl. .................. 210/747; 210/170; 210/220; 435/52; 435/128; 166/305.1
[58] Field of Search ......................... 210/610, 747, 210/749, 170, 194, 195.2, 220; 435/52, 128; 166/305.1

[56] References Cited

U.S. PATENT DOCUMENTS

| | | |
|---|---|---|
| 3,846,290 | 11/1974 | Raymond ................. 210/610 |
| 4,401,569 | 8/1983 | Jhaveri et al. ............ 210/747 |
| 4,478,765 | 10/1984 | Tubbs ..................... 210/170 |
| 4,755,304 | 7/1988 | Hallberg et al. ......... 210/747 |
| 5,006,250 | 4/1991 | Roberts et al. .......... 210/747 |
| 5,171,104 | 12/1992 | Bernhardt ............... 210/170 |
| 5,302,286 | 4/1994 | Semprini et al. ........ 210/170 |
| 5,384,048 | 1/1995 | Hazen et al. ............ 210/747 |
| 5,456,550 | 10/1995 | Devlin ................... 405/128 |

*Primary Examiner*—Christopher Upton
*Attorney, Agent, or Firm*—Anthony Asquith & Co.

[57] ABSTRACT

The system places traces of nutrients and other treatment substances in the ground, in the path of an on-coming plume of contaminated groundwater. Boreholes placed across the plume contain respective diffusion tubes, the tubes being of e.g LDPE, or dialysis tubing. The remediation substance is circulated (pumped) through the diffusion tubes periodically. The remediation substance diffuses through the LDPE into the water in the borehole, and thence into the plume and is carried into the aquifer.

11 Claims, 3 Drawing Sheets

TREATMENT OF CONTAMINATED GROUNDWATER

This invention relates to the treatment of contaminated groundwater.

BACKGROUND TO THE INVENTION

The invention is aimed at simplifying the task of placing treatment chemicals and other substances into the ground, for the purpose of treating contaminants in groundwater, in-situ. Taking the water out of the ground for treatment is not particularly difficult technically, and if the water is taken out of the ground, the treatment chemicals can be applied to the water, above ground, in a reasonably well controlled manner, in whatever quantities and concentrations are required: but taking large quantities of water out of the ground, treating the water, and putting the treated water back, is very expensive, especially when the contaminant is of the kind that is hazardous in small traces.

THE INVENTION IN RELATION TO THE PRIOR ART

It has been proposed to inject, or otherwise place, chemicals, nutrients, and various substances directly into the ground, in the path of an on-coming plume of contaminated groundwater, in order that the contaminants in the water may pass through the substances. Thereby, the contaminated groundwater may be treated without taking the water out of the ground.

When dealing especially with treatment substances that, to be effective, and safe, can only be present in small traces, one of the difficulties is to inject the treatment substance evenly and smoothly, and to ensure an even dispersion of the treatment substance. In many cases, it is important that the treatment substance be evenly dispersed over the whole cross-sectional area of the oncoming plume, and to avoid pockets or streaks of concentration.

Some treatment substances are only effective if present in the right concentration. Too much can be toxic in itself, besides being wasteful of expensive materials. Too little, and the treatment substance may be too dilute to have an effect.

Of course, there are streaks and pockets of varying concentration of the contaminants in the plume, and the ideal would be to tailor the concentration of the treatment substance to exactly correspond to the concentration of the contaminant; however, it has been found to be a worthwhile contribution to the efficiency of the treatment system if the treatment substance at least is dispersed over the cross-section of the plume at an even, or pre-determined, concentration.

An aim of the invention is to provide a means for injecting small traces of treatment substances into moving groundwater, in-situ, in such a manner that the concentration of the injected substances in the groundwater is smoothly and evenly dispersed through the water.

Another aim of the invention is to provide a system for injecting small traces of treatment substances into moving groundwater, in-situ, in such a manner that the concentration of the injected substances in the groundwater can be controlled to tighter limits than has been possible hitherto.

THE GENERAL FEATURES OF THE INVENTION

The invention involves the use of a borehole or well, which is formed down into the ground from the surface. The borehole may or may not be provided with a well-casing, but in any event the borehole is open to the throughflow of groundwater passing in through from side to side of the borehole, i.e, flowing laterally across and through the borehole.

A length of tubing is placed in the borehole, and arrangements are made for circulating the substance through the tubing. Some kinds of plastic and other non-rigid materials have the property that the plastic material is not entirely proof against the passage of liquids and gases. That is to say, some fluids can leak through the walls of tubes made from some kinds of plastic.

The crystalline structure of the plastic is such that only a portion of the material is crystalline, and the rest is amorphous. It is the amorphous areas which can allow the diffusion of fluids, especially those having the smaller molecules.

Low density polyethylene (LDPE) is a plastic which has this property of allowing many substances to diffuse through, at significantly quantifiable flow rates, LDPE having a fairly high proportion of amorphous structure. Besides, LDPE is inexpensive and readily available, and its use is preferred in the invention. Dialysis tubing may be used when large diffusion flux rates are called for.

In the invention, the substance diffuses out through the walls of the diffusion tube, and enters the groundwater in the borehole. The substance is then picked up by the moving groundwater, and is borne downstream along with the groundwater.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
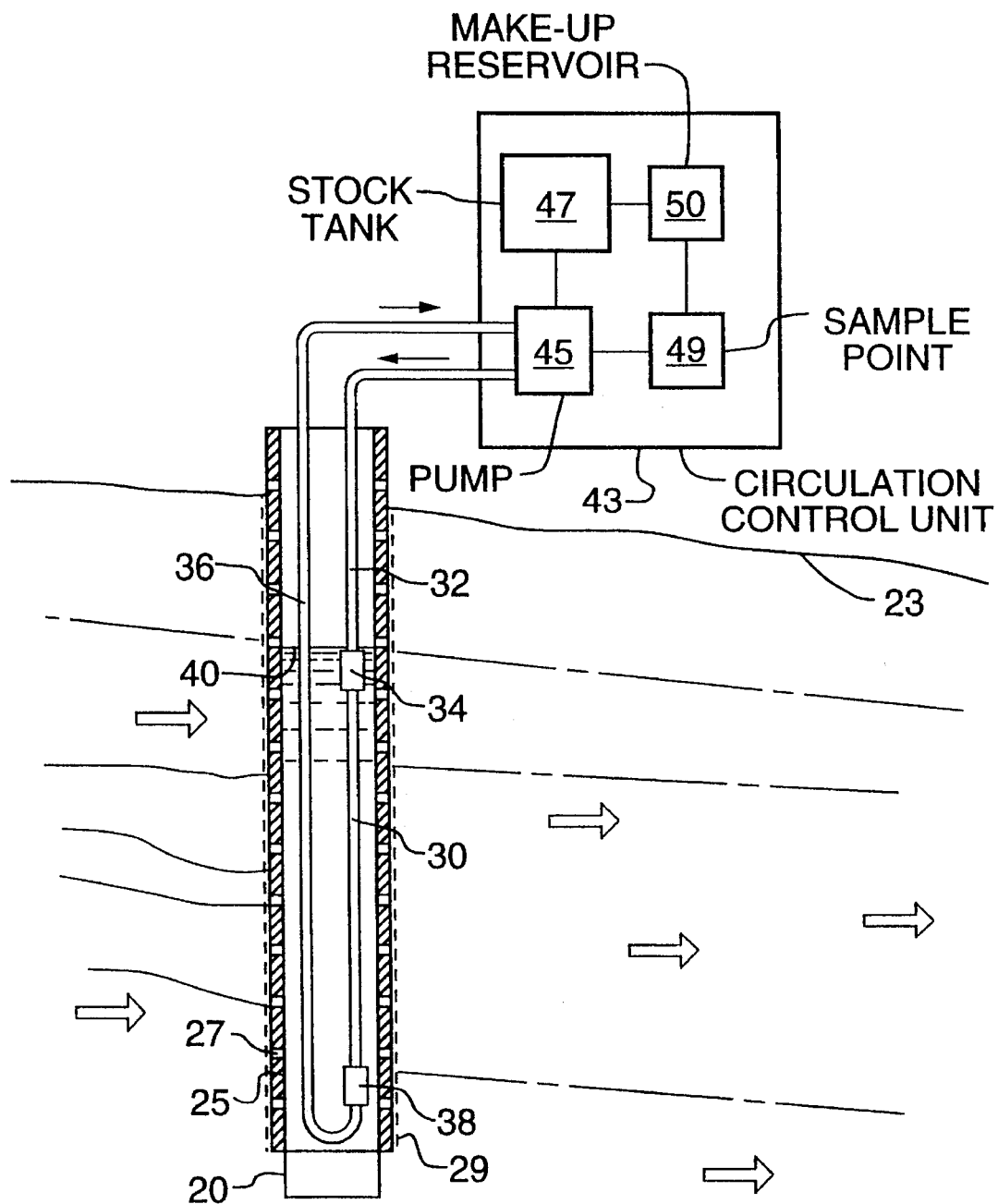
FIG. 1 is an elevational cross-section of a polluted aquifer, containing a borehole, in which the system of the invention is being used to supply treatment material.

FIG. 1 shows a borehole 20 extending vertically down into the ground from the surface 23. The borehole is provided with a lining or casing 25. The casing 25 is provided with openings 27, through which water can pass laterally into and out of the borehole, while screens 29 keep the borehole clear of gravel and other debris.

Into the borehole is inserted a length 30 of diffusion tube, comprising a length of plastic tubing. The diffusion tube 30 is placed down the borehole 20. An entry pipe 32 conveys fluid into the top or entry end 34 of the diffusion tube 30, and an exit pipe 36 takes fluid emanating from the bottom or exit end 38 of the diffusion tube 30 back out of the borehole 20. The diffusion tube lies beneath the surface 40 of groundwater present in the borehole 20.

The entry and exit pipes 32,36 are brought out of the borehole, and are coupled to a circulation control unit 43, which resides outside the borehole, above ground.

The unit 43 contains a peristaltic pump 45 or other means for circulating the fluid through the tubing and around the pipes in an accurately controlled manner. Peristaltic pumps are of course well-known for their capability, once set up, of metering small quantities of material in an accurate and controlled manner.

The pump 45 circulates the fluid around the pipes and the diffusion tube, and through a stock tank 47. A sampling point 49 includes a means (which may be conventional) for determining the composition of the fluid in the circulation system, and especially for determining the concentration of the remedial or treatment substance within the fluid. If the concentration should drop too low, provision is made within the structure of the unit 43 for make-up quantities of the treatment ingredients to be added into the fluid, e.g from a replenishment reservoir 50.

Such checking of the concentration, and making up where necessary, can be done more or less entirely automatically. The functions can be performed either by a simple timer, and/or in response to requirements as derived from the concentration measurements. As such, it will be understood that the system, once set up, can be left to operate without attention (other than occasional inspection) for periods that can be measured in weeks or months.

The circulation of the treatment fluid through the diffusion tube is important. If the fluid were not circulated, the concentration of the remedial substance within the fluid in the diffusion tube would gradually become reduced.

There is usually no need for the circulation of the fluid through the diffusion tube to be continuous. Circulation for 15 or 30 minutes once a day, or once every two days, typically will suffice, at least when the flux or flow rate required of the remedial substance into the groundwater is quite small. If larger quantities of remedial substance are required, the greater will be the tendency for the concentration of the remedial substance in the diffusion tube to become depleted more quickly, and the more often the fluid should be circulated. Indeed, continuous circulation is called for in some cases. However, the intention generally is that continuous circulation would be well in excess of what is required: the system is mainly intended, not for injecting fluids at maximum flux rates, but for maintaining accurate control of small concentration densities, evenly over large areas of groundwater, and over long periods The concentration will eventually drop in the diffusion tube, as the remedial substance is consumed. However, if the volume capacity of the stock tank is large enough, it may be possible to avoid the need for periodic make-up of the concentration of the remedial substance, and hence to avoid the need for the replenishment reservoir 50.

It should be noted that the volume of the remedial substance contained in the diffusion tube itself will not, in general, be enough for the concentration of the substance to be maintained for an adequate period of time without circulation. That is to say: if the fluid in the diffusion tube 30 were not circulated at all, the concentration in the tube would fall off too quickly, whereby control of the concentration of the remedial substance in the groundwater could not be accurately maintained.

Use of the system is advantageous when the fluid which is circulated through the diffusion tube comprises the treatment or remedial substance dissolved in a carrier liquid, such as water.

Preferably, the solution of the remedial substance in the water is far from being saturated, i.e is at a low or dilute concentration. Again, it is noted that the benefit of the system as described lies not so much in achieving a maximum flux rate of the remedial substance, but rather in the accurate control of a small flux rate. Placing the remedial substance, at low concentrations, evenly, into a wide front of slowly-moving groundwater is a quite different task from the more common task of injecting substances, when the main aim is to achieve a maximum flux rate.

It is contemplated that the remedial substance may be a gas. If the gas can be dissolved in a carrier, such as water, so much the better. If the remedial substance is a gas of a type that cannot be dissolved, the gas may be passed through the diffusion tube in the gaseous phase. However, the liquid phase is preferred.

The reason the liquid phase is preferred is that the flux rate at which a substance diffuses through a permeable wall is affected by the pressure differential across the wall. If the engineer desires the flux rate to be constant, he should ensure the pressure differential is constant. However, the pressure of the groundwater lying outside the diffusion tube is not constant, but of course varies with depth. If the fluid being circulated in the diffusion tube has the same density as the groundwater, the pressure in the fluid also varies with depth, and parallels the pressure of the groundwater—and any induced excess of pressure obtains independently of depth, over the height of the diffusion tube. But when the fluid being circulated is a gas, the gas is at constant pressure throughout the circulation system, whereas the pressure of the groundwater varies with depth, and as a result the pressure differential at the top end of the diffusion tube, where the groundwater pressure is low, is different from the pressure differential at the lower end of the diffusion tube, where the groundwater pressure is high.

When the fluid being circulated is a gas, therefore, a considerable variation in concentration with depth must be expected. However, in some cases this can be allowed for, and the use of a gas as the circulation fluid is not ruled out.

Another reason liquid-phase fluids are preferred to gas-phase is that the liquid-phase can be diluted, e.g with water. Dilution/concentration is a parameter that can be accurately and readily controlled. In the system as described, the flux rate of diffusion of a dissolved liquid substance can be fine-tuned by controlling the concentration of the solution, which can be done simply, yet accurately.

As mentioned, it is preferred, for reasons of flexibility of control, that the liquid substance being injected is not saturated, but is dilute, in solution in the carrier liquid. The carrier liquid need not be water, although usually water will be the most convenient. The treatment liquid need not in fact be a solution in the carrier liquid. When the treatment liquid is a non-aqueous-phase liquid, it can still be advantageous to carry the NAPL in water, and similarly to keep the proportion of NAPL low.

In the system as described, a substance inside the diffusion tube 30 diffuses through the walls of the tube and enters water lying outside the tube, in the borehole. The rate at which the diffusion takes place is determined by the molecular structure of the material of the wall of the tube. When the material is LDPE, as manufactured for the common LDPE tubing used in very many applications, the variations in the crystalline structure of the wall material, and of course the thickness of the wall, can be expected to vary somewhat, at different locations along the length of the tube.

That being so, is a reason the circulation of the fluid within the diffusion tube is preferably of a periodic nature. The interruptions in the circulation—the fluid then being stationary—serve a useful purpose, as follows.

Because the walls of the diffusion tube are not exactly uniform (not uniform, that is to say, as regards the ratio of amorphous to crystalline structure), the substance leaks out more quickly through the more porous areas of the tube wall. If the fluid is stagnant, a local volume of the fluid would then become depleted—and the more permeable the local area of the wall, the more the local volume of the fluid would be depleted. The rate of diffusion being concentration-dependent, that depletion would therefore slow down the ensuing diffusion through that area of the wall. Therefore, the system has at least a marginal capability to self-correct, and to keep concentrations of the remedial substance constant within the groundwater, even though wall-permeability may vary. The capability arises provided the water is left, without moving, for long periods.

Thus, although periodic circulation is important for maintaining overall levels of concentration over a long time, the periods of non-circulation are important also, because they smooth out variations in concentration doe to variations in wall-permeability.

As mentioned, many types of plastic tubing tend to allow migration or diffusion of molecules through the wall of the tubing, LDPE being well-suited in many cases. However, LDPE tubing, as available commercially, may not always be the same as to its crystalline structure, which is the factor that mainly sets the diffusion coefficient. Wall thickness variations also cannot be ignored.

The engineer should therefore carry out laboratory tests on samples of the particular batch of tubing, in order to determine the diffusion coefficient for that batch. Knowing the diffusion coefficient, and knowing the extent, nature, and concentration, of the contaminant in the groundwater, the inground velocity of the groundwater, the positioning of the boreholes, the nature of the remedial substance, and so on, the engineer can compute what the concentration of the remedial substance in its carrier fluid should be, and can set up the fluid circulation means appropriately to maintain that required concentration.

The engineer adjusts the concentration of the remedial substance in its carrier fluid as the main agency by which the flux rate of the remedial substance is finely and accurately controlled. He can make gross adjustments to the flux rate by selecting, as the diffusion tube, a tube with a different wall thickness or diameter. Of course, a finer degree of control is required for the diffusion flux rates than can be achieved merely by altering wall thickness.

The prudent engineer should check the diffusion coefficient of each batch of LDPE tubing, because significant variations can occur between batches. However, the coefficient, once determined, does not change with time. The coefficient is simple enough to determine in a laboratory, involving setting up the lengths of tubes, standardising the conditions of entry concentration, circulation characteristics, etc, and noting the exit concentration.

Although each diffusion tube should be individually tested, the testing is not onerous, and the number of diffusion tubes per installation is not large, at least in the context of the task of cleaning up a toxic plume moving through an aquifer.

If it is found that the diffusion tubes have reasonably identical diffusion coefficients, they may all be fed from a single circulation control unit, which would be adjusted to supply the (single) concentration of remedial substance appropriate to the average of the coefficients. In other cases, it might be preferred to have a circulation control unit for each diffusion tube, and to tailor the concentrations in each tube of the remedial substance in its carrier fluid to cater for the variations in coefficient, whereby the same flux rate can be maintained from each tube.

In some cases, it may be preferred, in fact, to vary the flux rate from the various diffusion tubes. Many plumes are more concentrated in the centre than at the edges, for example, and the engineer may wish to tailor the flux rates tube to tube, across the width of the plume, accordingly.

Equally, some plumes vary in concentration over the vertical depth of the plume. In that case, the engineer may specify, for instance, that the portion of the diffusion tube that will diffuse remedial substance into the topmost and bottommost margins of the plume be of a thicker wall thickness than the tubing which diffuses remedial substance into the central band of the plume, where the contaminants may be more concentrated.

The pipes and conduits which convey the remedial substance in its carrier fluid need not be all LDPE tubing, like the diffusion tube. For example, the pipes may be of metal tubing, through which no discernible diffusion can take place.

In order for circulation to take place, the engineer must provide a down-tube and a return-tube. The engineer may arrange that both the down-tube and the return-tube are both diffusion tubes, of LDPE or other suitable plastic. Or, he may arrange that only one of the tubes is a diffusion tube, and the other tube is of metal. The entry end of the diffusion tube would be located at the bottom of the diffusion tube if the diffusion tube is the return tube.

It is possible for back-diffusion to take place. That is to say, it can happen that molecules of groundwater lying outside the diffusion tube can diffuse into the tube. However, if this should occur, its effects on the dilution-concentration of the remedial substance in its carrier fluid would be picked up by the routine sampling, and the effects could be adjusted for automatically. If the remedial substance is a gas, perhaps it could not be ruled out that a small quantity of back-diffusing water might collect on the inside of the diffusion tube, but the volume of water thus collected would hardly be significant enough to affect the performance of the system.

Thus, especially if a pressure differential is engineered whereby the fluid on the inside of the diffusion tube is at a higher pressure than the surrounding groundwater, back-diffusion can largely be ignored.

One of the reasons back-diffusion can be ignored is that, in the system as described, the ratio of diffusion area of the tube to the volume of fluid contained in the tube is small. If the diffusion tubes were small-bore, such that the area-to-volume ratio were larger, then the phenomenon of back-diffusion could start to become significant. In the example of FIG. 1, the diffusion tube is LDPE of typically 32 mm overall diameter, and 3.2 mm wall thickness. The preferred range of tube diameters that may be suitable are 5 mm to 50 mm diameter.

Back-diffusion, not just of the water, but of the contaminants in the groundwater can also occur sometimes (although the type of contaminants that are hazardous in small concentrations are often organic, such as chlorinated hydrocarbon solvents, etc, the molecules of which are fairly large, and are thus not so able to diffuse through plastic as molecules of water).

Figure 2:
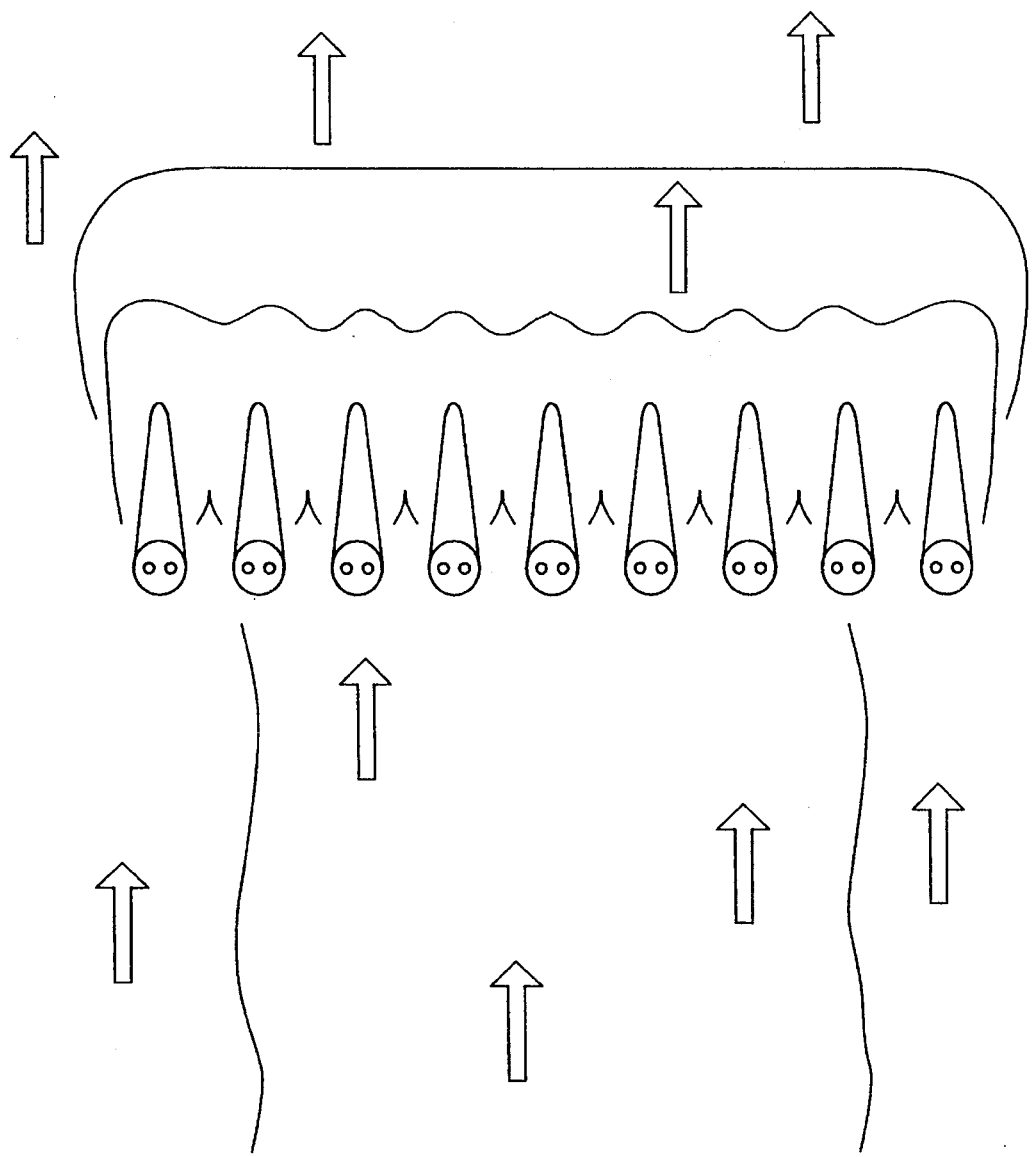
FIG. 2 is a plan view of the aquifer of FIG. 1.

FIG. 2 is a plan view of several of the boreholes 20, arranged in a line across the path of the oncoming plume of contaminant. The diffusion tubes 30 are mounted in the boreholes in down-and-return pairs.

The boreholes comprise wells, typically of 25 cm diameter. The boreholes contain groundwater, which flows through the borehole, ie laterally from side to side. The screens 29 should be such that the water inside the borehole 20 is largely free from soil and dirt particles.

The remedial substance, upon being released from the diffusion tube, enters the water in the borehole. It may be expected that the substance will diffuse quickly through the water in the borehole, whereby the concentration of the remedial substance will be substantially constant over the whole volume of water in the borehole.

As the groundwater moves through the boreholes, the remedial substance is carried in plumes 56, downstream of the boreholes. The remedial substance can be expected to spread laterally and vertically from these plumes. However, generally, in most aquifer materials, there is some horizontal layering, whereby the vertical spread will be quite small. However, in the system as described, this poor vertical spreading characteristic is of no consequence, because the diffusion tube extends over the whole vertical height of the contaminant plume.

Lateral spread will more readily arise, and it can be expected that the plumes of remedial substance from adjacent boreholes will meet and join, laterally, a short distance downstream of the boreholes. The engineer should specify the spacing of the boreholes according to prior determinations of the lateral spreading characteristics of the particular aquifer material, so that the adjacent plumes do meet before the remedial substance starts to become depleted. Thus, even though emitted from discrete points, the remedial substance can move downstream in the groundwater as a complete front.

As the remedial substance acts on the contaminant in the groundwater, the remedial substance starts to become depleted. It is the engineer's task to make sure the concentrations and other parameters are (just) enough to enable proper and complete treatment of the contaminant.

In a typical case, the contaminant may be, for example, TCE (trichloroethylene). The solubility of TCE is such that TCE can be dissolved in groundwater at concentrations of several milligrams per liter of groundwater. However, the drinking water standard is only a few micrograms per liter. TCE in light concentrations can be treated by microbial action, but one difficulty is that heavy concentrations of TCE can be toxic to the microbes. The difficulty could be addressed by maintaining a high population density of microbes. This can be done by supplying a nutrient, such as toluene, upon which the microbes feed, and which enables the microbes to build up their numbers until the population density is large enough to break down the TCE. If the toluene were injected jerkily or patchily, the microbe population would be patchy, and the TCE would not be broken down evenly. The toluene must be injected evenly, and at small concentration densities, over the whole area of the plume. The system as described is very well-suited for that task. The treated water can be expected to contain less than the allowed concentrations of TCE and of toluene—whereas, if the injection of the toluene were not done accurately, smoothly, and evenly, traces of both those substances might be present, at least in patches.

As described, the diffusion tubes 30 are placed inside the boreholes 20, and the remedial substance diffuses out of the diffusion tube, into the body of water present in the borehole. It would not be possible to use the borehole itself (that is to say, the lining or casing of the borehole) as the diffusion tube. A key feature of the system as described is that the concentration is so tightly and accurately controlled, and that feature arises because the remedial substance is circulated through the diffusion tube.

Circulation is only possible when both ends of the diffusion tube are accessible and available for conveying the remediation substance.

Figure 3:
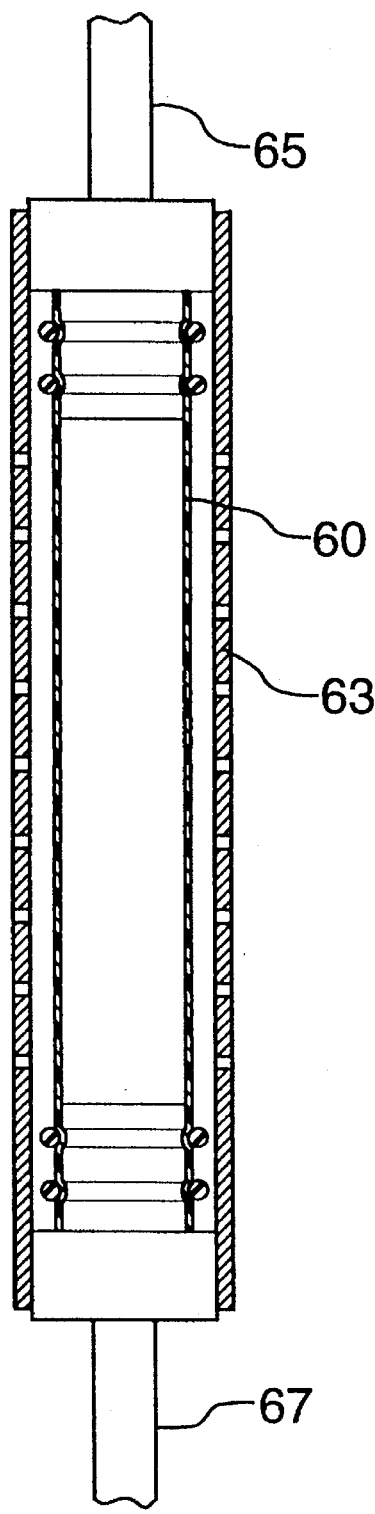
FIG. 3 is a diagram showing the details of the construction of a type of diffusion tube.

FIG. 3 shows another system for injecting small concentration densities evenly over a large body of water, but where the flux rate is rather too large to be handled conveniently by LDPE tubing. In place of the length of LDPE tubing, the diffusion tube in this case comprises a length of dialysis tubing 60.

The dialysis tubing has a typical thickness of 0.04 mm, and is rather flimsy mechanically in the context of a downhole installation. The dialysis tubing is therefore housed in a protective sheath 63. The sheath comprises a slotted screen, made of PVC. The dialysis tubing is sealed to the sheath 63, and inlet and outlet pipes 65,67 are fed into the tubing, as shown.

The materials used are selected so as to be unaffected by the particular contaminant and remedial substance.

The tubing 60 as employed was Spectra/Por 5 (TM of Spectrum Medical Ind Inc) regenerated cellulose-impregnated dialysis tubing. Suitable forms of dialysis tubing, for use in the system as described, can be obtained in thicknesses of 16–60 micrometers.

The concentration gradient over the whole length of the tube is kept constant by periodic circulation of the stock solution of the remedial substance, in the manner as described previously.

It should be understood that the expression borehole as used herein is not confined to a drilled well of cylindrical profile. Thus, for example, a cavity in the ground that was formed by inserting sheet piling into the ground to form an enclosure, then excavating soil material from inside the enclosure, would still be a borehole within the context of the invention.

Similarly, the expression diffusion tube is not intended to be narrowly construed as referring only to circular-profile manufactured tubing. So long as the ends of the tube are available for circulation of the fluid through the tube, the profile of the diffusion tube is of little importance.

The systems as described are intended for the accurate control of small and very small concentration densities, spread evenly over a large volume of groundwater, which is extensive as to area, and over the depth of the plume.

The invention is aimed at minimising the need for expensive close control, the intention being to provide a system that can be left for a maximum period without intervention.

We claim:

1. Procedure for placing small quantities of a substance into groundwater moving through an aquifer, comprising the steps of;

in a borehole in the material of the aquifer, placing a diffusion tube down from the ground surface into the depth of the borehole;

the borehole being of the kind into which groundwater can enter from the aquifer, can pass through, and can re-enter the aquifer, laterally;

providing a source of the substance in fluid form;

the diffusion tube is made of a material of the kind through which the fluid substance is capable of diffusing molecularly;

placing the diffusion tube in the borehole, whereby the diffusion tube is located in the groundwater in the borehole;

the diffusion tube having an entry end and an exit end, and forming means for passing fluid through the diffusion tube, from the entry end to the exit end thereof;

the diffusion tube being substantially imperforate, and being thereby closed to the escape of fluid out of the diffusion tube, other than by molecular diffusion through the material of the tube, between the entry end and the exit end thereof;

providing a circulation means, comprising a means for pressurising the fluid substance, and for conducting the fluid substance to the entry end of the diffusion tube, conducting the fluid substance through the diffusion tube from end to end thereof, and for collecting the fluid substance emerging from the exit end of the diffusion tube, and for circulating the fluid substance and returning same to the entry end;

and circulating the fluid substance through the diffusion tube.

2. Procedure of claim 1, wherein the procedure includes the step of circulating the fluid substance for a short time periodically, and keeping the fluid in the diffusion tube substantially still when not being circulated.

3. Apparatus for placing small concentrations of a substance into groundwater moving through a borehole in an aquifer, wherein:

the borehole is of the kind into which groundwater can enter from the aquifer, can pass through the borehole laterally, and then re-enter the aquifer;

the apparatus includes a diffusion tube, located in the borehole, and extending down from the ground surface into the depth of the borehole;

the apparatus includes a source of the substance in fluid form;

the diffusion tube is made of material of the kind which enables the slow molecular diffusion of the said fluid substance therethrough;

the diffusion tube has an entry end and an exit end, and forms a means for passing the fluid substance through the diffusion tube, from the entry end to the exit end thereof;

the diffusion tube is substantially imperforate, and is thereby closed to the escape of fluid out of the diffusion tube, other than by molecular diffusion through the material of the tube, between the entry end and the exit end thereof;

the apparatus includes a circulation means, comprising a pump means and a conduit means;

the pump means is operable, and is effective, when operated, to move the fluid substance;

the conduit means is a means for conducting the fluid substance to the entry end of the diffusion tube, for conducting the fluid substance through the diffusion tube from entry end to exit end thereof, and for collecting the fluid substance emerging from the exit end of the diffusion tube, and for circulating the fluid substance and returning same to the entry end.

4. Apparatus of claim 3, wherein the diffusion tube is made of a plastic polymer material, of the kind which is at least partly amorphous.

5. Apparatus of claim 4, wherein the diffusion tube is made from low density polyethylene (LDPE) tubing.

6. Apparatus of claim 5, wherein the wall thickness of the LDPE tubing is at least 0.3 mm.

7. Apparatus of claim 5, wherein the tubing is in the diameter range 5 mm to 5 cm overall.

8. Apparatus of claim 3, wherein the diffusion tube comprises a length of dialysis tubing.

9. Apparatus of claim 3, wherein the fluid substance comprises a treatment substance carried by a carrier liquid.

10. Apparatus of claim 9, wherein the treatment substance is dissolved at a dilute, non-saturated concentration, in the carrier liquid.

11. Apparatus of claim 3, wherein the apparatus includes a means for pressurizing the fluid in the diffusion tube, whereby the fluid is at a higher pressure inside the tube than the pressure of the groundwater outside the tube.

* * * * *